(12) United States Patent
    Matzen

(10) Patent No.: US 8,987,930 B2
(45) Date of Patent: Mar. 24, 2015

(54) WIND FARM AND METHOD FOR OPERATING A WIND FARM

(75) Inventor: Bjoern Matzen, Bollingstedt (DE)

(73) Assignee: Senvion SE, Hamburg (DE)

( * ) Notice: Subject to any disclaimer, the term of this patent is extended or adjusted under 35 U.S.C. 154(b) by 81 days.

(21) Appl. No.: 13/824,292

(22) PCT Filed: Dec. 23, 2011

(86) PCT No.: PCT/EP2011/074025
§ 371 (c)(1),
(2), (4) Date: Mar. 15, 2013

(87) PCT Pub. No.: WO2012/089698
PCT Pub. Date: Jul. 5, 2012

(65) Prior Publication Data
US 2013/0175801 A1    Jul. 11, 2013

(30) Foreign Application Priority Data
Dec. 29, 2010 (DE) .......... 10 2010 056 458

(51) Int. Cl.
F03D 9/00    (2006.01)
H02P 9/04    (2006.01)
F03D 7/02    (2006.01)
F03D 7/04    (2006.01)
H02P 9/10    (2006.01)

(52) U.S. Cl.
CPC .............. *F03D 9/005* (2013.01); *F03D 7/0284* (2013.01); *F03D 7/048* (2013.01); *H02P 9/10* (2013.01); *F05B 2270/1071* (2013.01); *F05B 2270/337* (2013.01); *Y02E 10/723* (2013.01)
USPC ......................................... 290/44

(58) Field of Classification Search
CPC ....... F03D 9/005; F03D 7/0284; F03D 7/048; F03D 9/00; H02P 9/10; Y02E 10/723; F05B 2270/1071; F05B 2270/337
USPC .......................................... 290/44, 43, 54, 55
See application file for complete search history.

(56) References Cited

U.S. PATENT DOCUMENTS

2011/0175355 A1*    7/2011    Rosenvard ................. 290/44
2012/0146423 A1*    6/2012    Bodewes et al. ............ 307/84

FOREIGN PATENT DOCUMENTS

| EP | 1 752 659 | 2/2007 |
| EP | 2 166 225 | 3/2010 |
| EP | 2 236 821 | 10/2010 |

OTHER PUBLICATIONS

International Preliminary Report on Patentability dated Jul. 2, 2013, directed to International Application No. PCT/EP2011/074025; 9 pages.
International Search Report mailed Jul. 16, 2012, directed to International Application No. PCT/EP2011/074025; 5 pages.

* cited by examiner

*Primary Examiner* — Javaid Nasri
(74) *Attorney, Agent, or Firm* — Morrison & Foerster LLP

(57) ABSTRACT

A method for operating a wind farm comprising several wind turbines that are connected to an internal grid of the wind farm is disclosed. In the method, during a mains failure the electrical consumers of the wind turbines are supplied with electrical energy by a mains replacement supply unit. Each electrical consumer of the wind turbines is assigned to one of at least two groups and according to the group assignment is always switched on by an operation control unit when required, or only switched on if there is a sufficient power reserve. The wind farm is designed to carry out the method.

14 Claims, 3 Drawing Sheets

Fig. 3a

$$\boxed{90} = \frac{\boxed{91} - \boxed{92}}{\boxed{93}}$$

Fig. 3b

$$\boxed{90} = \frac{\boxed{91} \cdot \left(1 - \boxed{92'}\right)}{\boxed{93}}$$

Fig. 4

$$\boxed{95} = \boxed{90} - \boxed{96}$$

WIND FARM AND METHOD FOR OPERATING A WIND FARM

REFERENCE TO RELATED APPLICATIONS

This application is a national stage application under 35 USC 371 of International Application No. PCT/EP2011/074025, filed Dec. 23, 2011, which claims the priority of German Application No. 10 2010 056 458.3, filed Dec. 29, 2010, the entire contents of which are incorporated herein by reference.

FIELD OF THE INVENTION

The invention relates to a method for operating a wind farm and to a wind farm. In particular, the wind farm can be an offshore wind farm.

BACKGROUND OF THE INVENTION

Wind farms comprise pluralities of wind energy installations, wherein the power generated in the wind energy installations is first fed into a grid internal to the wind farm. At a transfer station the power from the grid internal to the wind farm is fed to an external supply grid. The grid internal to the wind farm is usually a medium-voltage grid, whereas the external supply grid is a high-voltage grid. A transformer is therefore provided at the transfer station to transform between the voltage of the medium-voltage grid and the voltage of the high-voltage grid. Offshore wind farms are usually connected to the supply grid by a single power cable, where the transfer station and, when relevant, the transformer, are arranged on a central platform of the wind farm.

A supply of power is necessary for the operation of individual wind energy installations or of a wind farm, so that particular electrical components of the wind energy installations or of the wind farm can be operated. These electrical components include, amongst other things, control units, drive units for the adjustment of pitch and/or azimuth, and for the obstruction lighting. This energy supply is usually ensured by the supply grid. If the supply of energy from the supply grid breaks down, the operation of the electrical components can also no longer be ensured. Components such as the obstruction lighting that are necessary for the survival and/or safety of the wind energy installations are also affected by this.

The supply of energy breaks down, for example, if the supply grid fails, or if there is a fault in the power cable or damage to the transfer station. The latter cases are particularly critical for offshore wind farms, since some of these are only connected to the supply grid over a single power cable and a single transfer station, whose repair is time-consuming and, in some cases, can take several months.

The provision of an independent power supply (UPS) at each wind energy installation, with which individual consumers of the wind energy installations can still continue to be operated when the supply of energy over the supply grid fails, is known from the prior art. UPSs according to the prior art have a limited capacity, and can, for instance, supply the electrical components of a wind energy installation with energy for 24 hours. A longer failure of the supply of energy over the supply grid requires the UPSs to be charged regularly.

The provision of a central emergency power generator at the transfer station for charging the UPSs is known. The charging of the UPSs can be carried out here for all of the wind energy installations at the same time, or only for some of them. The emergency power generator must, whatever the case, be dimensioned such that at no stage is all the energy stored in the UPSs of the individual wind energy installations completely used up, the electrical components of the wind energy installations then no longer being capable of operation.

A commercial fuel-powered generator arranged at the transfer station of the wind farm is usually employed as an emergency power generator. In offshore wind farms in particular, the space available for such a generator and its fuel tank (which can, for instance, be arranged on a central platform of the wind farm) is limited, for which reason the fuel tank is often small. This has the consequence that frequent refueling is necessary and this, as a result of the distance and the weather, is difficult with offshore installations.

SUMMARY OF THE INVENTION

On the basis of the prior art described above, the task addressed by the invention is that of providing a method for operating a wind farm and a wind farm in which the disadvantages present in the prior art are no longer found, or only to a reduced extent.

This task is fulfilled by a method and a wind farm as broadly described herein. Advantageous embodiments emerge from the detailed embodiments described below.

The invention accordingly relates to a method for operating a wind farm having a plurality of wind energy installations connected to a grid internal to the wind farm, each having an operating control unit and other components comprising electrical consumers, and a mains substitute supply unit connected to at least some of the electrical components of the wind energy installations, wherein the electrical consumers of each wind energy installation are divided into at least two groups, where at least the consumption values of the electrical consumers of a second group are stored in the operating control unit of the wind energy installation concerned, the electrical consumers can be switched on and off by the operating control unit of the wind energy installation concerned when requested, wherein the operating control unit has a grid fault mode in which a power reserve is calculated from a maximum consumption value and the actual consumption of the electrical consumers that are switched on, the operating control unit switches an electrical consumer of a first group on when requested and switches an electrical consumer of the second group on when requested and when there is a power reserve greater than or equal to the consumption value of the requested electrical consumer.

The invention relates further to a wind farm comprising a plurality of wind energy installations connected to a grid internal to the wind farm, each having an operating control unit and other components comprising electrical consumers, and a mains substitute supply unit connected to at least some of the electrical components of the wind energy installations, wherein the electrical consumers of each wind energy installation are divided into at least two groups, where at least the consumption values of the electrical consumers of a second group are stored in the operating control unit of the wind energy installation concerned, the electrical consumers can be switched on and off by the operating control unit of the wind energy installation concerned when requested, wherein the operating control unit has a grid fault mode in which a power reserve is calculated from a maximum consumption value and the actual consumption of the electrical consumers that are switched on, the operating control unit switches an electrical consumer of a first group on when requested and switches an electrical consumer of the second group on when requested and when there is a power reserve greater than or equal to the consumption value of the requested electrical consumer.

Some terms employed in the context of the invention are first explained in more detail:

Switching on and/or off "when requested" means that a relevant consumer is only switched on when it is actually needed. An electrical consumer can also be switched off again as soon as it is no longer needed. A pitch adjusting unit, for example, or its drive for setting the angle of attack of one or more rotor blades, is only switched on when a change is actually to be made. Once the angle of attack has been adjusted, the pitch adjusting unit or its drive can be switched off again. In contrast to this, for instance, the operating control unit, which is also an electrical consumer of a wind energy installation, must operate continuously, and therefore the operating control unit must remain switched on continuously.

"Power reserve" refers to electrical power that is, in principle, available, but that is not used. The power reserve is the difference between the power demand and the available power.

The "consumption value" of an electrical consumer refers to the value of the expected power consumption of the electrical consumer when operating. This may be the maximum power consumption of an electrical consumer. It is also, however, possible, in the event of a grid fault, for an electrical consumer to be operated with lower power consumption, which then forms the consumption value.

During a "grid fault" it is generally not possible for electrical power to be fed from the grid internal to the wind farm into the supply grid. A grid fault occurs, for instance, if the supply grid breaks down, or if there are technical problems in the connection between the grid internal to the wind farm and the supply grid. Apparatus and methods for detecting grid faults (phase monitors, for example) are known from the prior art.

The invention is based on the recognition that intelligent consumption management, as is achieved by the method according to the invention or by the wind farm according to the invention, can improve the operation of a wind farm in the event of a grid fault.

By dividing the electrical consumers of a wind energy installation into at least two groups, the individual electrical consumers are prioritized.

The electrical consumers of a first group are entirely essential for the survival and safety of the individual wind energy installations. There must therefore always be sufficient electrical power available so that all the consumers of the first group can be operated when correspondingly requested. The first group can, in particular, include all the safety-relevant components of a wind energy installation, such as the installation controller and obstruction markers (aviation and/or shipping beacons). Communication equipment and meteorological measuring equipment or grid monitoring equipment can also be assigned to the first group.

The electrical consumers of a second group that may be needed in grid fault mode are only then operated if sufficient power reserves are available. Such power reserves can, for instance, arise if one or more electrical consumers of the first group are switched off because they are not needed, i.e. there is no request. If, for example, the positioning motors for azimuth adjustment are assigned to the first group, they are only switched on when azimuth adjustment is in fact necessary. During the rest of the time the positioning motors for azimuth adjustment are switched off. A power consumption of the electrical components that is significantly lower when compared to operation under full load is equivalent, in the context of this invention, to being switched off. The power that is not needed for the positioning motors for azimuth adjustment when they are switched off is then available as a power reserve, and can be used by electrical consumers of the second group. Examples of components that can be assigned to the second group include dehumidifiers or heating elements with which the climate inside the nacelle can be regulated, along with pitch adjusting units.

The mains substitute supply unit must be dimensioned such that all the electrical consumers of the first group in each wind energy installation—i.e. those consumers that are absolutely essential for the survival and safety of the wind energy installation—can be operated. The mains substitute supply unit can here however be dimensioned smaller than in the prior art, in which no intelligent consumption management according to the invention, with prioritized switching on and off of electrical consumers, is present.

Because of the intelligent consumption management according to the invention, the total energy consumption during a grid fault falls in comparison with the prior art, since electrical consumers of the second group that are not entirely essential are switched off. If the mains substitute supply unit is an emergency fuel-powered electrical generator, the fuel consumption consequently falls, and, with a tank that remains the same size, refueling is required less often when compared with the prior art. The last point is particularly relevant to offshore wind farms, since the refueling process is expensive and insecure due to the distance and the weather.

Because, as a result of the consumption management according to the invention, it is still ensured that the as a result of the electrical consumers of the individual wind energy installations in the wind farm the maximum power of the mains substitute supply unit is not exceeded, i.e. there is always sufficient power to operate the electrical consumers of the first group, it is possible to omit an independent power supply (UPS) at the individual wind energy installations.

A maximum consumption value is stored in the operating control unit. It indicates how much energy in total the electrical consumers of a wind energy installation that are switched on may and can consume. The maximum consumption value is here preferably equal to or greater than the total of the consumption values of the electrical consumers of the first group, which means that the maximum consumption value is not exceeded even when all the electrical consumers of the first group are switched on. The maximum consumption value can be permanently saved in the operating control unit, or can be transmitted to the operating control unit via a data connection or similar.

The operating control unit is furthermore supplied with information about the actual consumption by the electrical consumers of a wind energy installation, or is able to determine it. The actual consumption can, for example, be determined by measuring equipment constructed for this purpose. It is, however, also possible for consumption values relating to the electrical consumers of the first and second groups to be stored in the operating control unit, and for the operating control unit to add up the consumption values of all the electrical components that are switched on to find the actual consumption.

The reserve power can be determined from the difference between the maximum consumption value and the actual consumption.

If there is now a request to switch on an electrical consumer of the second group, the operating control unit checks whether the power reserve is greater than the consumption value of the electrical consumer that is stored in the operating control unit. If that is the case, it follows that enough power reserve is available for the operation of the electrical consumer of the second group, and it can be switched on. If it is found that the power reserve is smaller than the consumption value of the electrical consumer of the second group, the electrical consumer is not switched on. If the request to switch the electrical consumer of the second group on persists, it can only be switched on when an adequate power reserve is available. This can, for instance, happen because an electrical consumer of the first or second group is switched off, and the power reserve rises again by its consumption value.

As has already been stated, the electrical consumers of the first group are those that are entirely essential for the survival and security of the wind energy installation. In accordance with the invention, these electrical consumers are always switched on when requested. If, when switching on an electrical consumer of the first group, the power reserve is smaller than the consumption value of this consumer, or it is found after switching on that the actual consumption is greater than the maximum consumption value, then preferably one or more electrical consumers of the second group are switched off, in order to make sufficient power available for the operation of the requested electrical consumers of the first group. Prioritization thus takes place, according to which the electrical consumers of the first group are always switched on when requested, whereas the consumers of the second group are only switched on if there remains sufficient power reserve available for all the electrical consumers of the first group that are switched on when requested.

It is preferable for the wind farm to comprise a farm master. A farm master is a central control unit that, for instance, can be arranged on the central platform of an offshore wind farm. The farm master is connected to the operating control units of the individual wind energy installations over data lines, so that data can be exchanged between the farm master and the operating control units. It is favorable if the farm master determines the maximum consumption value for the individual wind energy installations and transmits it to the individual operating control units of the wind energy installations.

The maximum consumption value can be determined from a specified value of the maximum power of the mains substitute supply unit, the number of wind energy installations in the wind farm and, possibly, a base load. The specified value of the maximum power of the mains substitute supply unit represents the maximum power that can be generated by the mains substitute supply unit. The base load includes all those factors that reduce the maximum power available from the wind energy installations. The base load can thus comprise power losses arising, for instance, from cable resistances. The requirement of the farm master itself or of other equipment of the wind farm can also be taken into account in the base load. The maximum consumption value for a single wind energy installation can be calculated in the simplest case for instance from the difference between the specified value of the maximum power of the mains substitute supply unit and the base load, divided by the number of wind energy installations in the wind farm. The maximum consumption value can be the same for all the wind energy installations, or can be individual.

It is, furthermore, preferable if the operating control units of the individual wind energy installations transmit the actual consumption and requests for switching on electrical consumers to the farm master. If the consumption values of the electrical consumers are stored at the farm master, or if they are transmitted together with the request from the operating control unit, the farm master, on the basis of this information, can increase the maximum consumption values of one or more wind energy installations and can simultaneously correspondingly reduce the maximum consumption values of one or more wind energy installations. Such unused power reserves of one or more wind energy installations can be distributed to other wind energy installations whose power reserve is not sufficient to operate all the requested electrical consumers—in particular those of the second group. It is here in particular possible for the farm master, when redistributing the power reserves, to take into account the fact that individual processes of the operating control unit of a wind energy installation, for which components of the second group must also be switched on, are completed before the maximum consumption value for this wind energy installation is reduced so much that the components of the second group have to be switched off. If, for instance, the pitch adjustment equipment of a wind energy installation is assigned to the second group, it is possible to ensure that an adjustment of the pitch at a wind energy installation is first completed before the maximum consumption value of this wind energy installation is reduced so much that the pitch adjustment has to be switched off and the pitch adjustment thus cannot be completed. It is important in this connection that the farm master makes sure at all times that there is always enough power reserve available to all the wind energy installations of the wind farm, so that all the requested electrical consumers of the first group can be operated. The total of the maximum consumption values of all the wind energy installations remains constant.

Preferably the operating parameters of a wind energy installation can be changed when in grid fault mode. For example the setpoint values for the temperature in a nacelle can here be changed, which setpoint values indeed ensure survival of the wind energy installation but less energy is required to maintain said setpoint values than for the setpoint temperature in the normal operating mode of the wind energy installation. A changed setpoint temperature means that heating or cooling systems such as fans etc. need to be operated less often, which lowers the energy consumption. As soon as the grid fault is rectified, the heating or cooling systems can then be operated again normally, so that the setpoint temperature in normal operating mode is achieved.

It is further preferable if at least one of the wind energy installations continues to be operated in grid fault mode. This (these) wind energy installation(s) can then feed power into the grid internal to the wind farm, and thus reduce the load on the mains substitute supply unit. As a result, the power to be generated by the mains substitute supply unit is reduced and—in the case of fuel-powered emergency power generators—so is the fuel consumption.

It is further preferable to provide a third group of electrical consumers, where the operating control unit in grid fault mode switches off the electrical consumers of the third group. The consumers of the third group are not needed for the survival and safety of a wind energy installation. In grid fault mode they can therefore be switched off without further consideration, and consequently also consume no electrical energy. Only when the operating control unit has left grid fault mode and consequently operates normally are the electrical consumers of the third group switched on again (when requested, if relevant).

The wind farm according to the invention is constructed to operate according to the method according to the invention. Reference is thus made to the foregoing explanations.

The mains substitute supply unit can be connected via separate cables to the individual wind energy installations and their electrical consumers. It is, however, favorable if the mains substitute supply unit is connected to at least some of the electrical consumers of the wind energy installations via the grid internal to the wind farm. The power generated by the mains substitute supply unit is then fed into the grid internal to the wind farm, and reaches the electrical consumers of the wind energy installations via that route.

One or more power contactors are preferably provided for switching the individual electrical consumers of a wind energy installation on and off. It is particularly preferred for a plurality of electrical consumers, for example those of the third group, to be connected via a busbar. These electrical consumers can then be switched on and off by means of a single power contactor arranged at the busbar.

BRIEF DESCRIPTION OF THE DRAWINGS

The invention will now be described by way of example on the basis of advantageous embodiments, with reference to the attached drawings. They show:

FIG. 3a, b: a symbolic representation of two alternative options for calculating the maximum consumption value;
and
FIG. 4: a symbolic representation of the calculation of the power reserve.

DETAILED DESCRIPTION OF THE INVENTION

Figure 1:
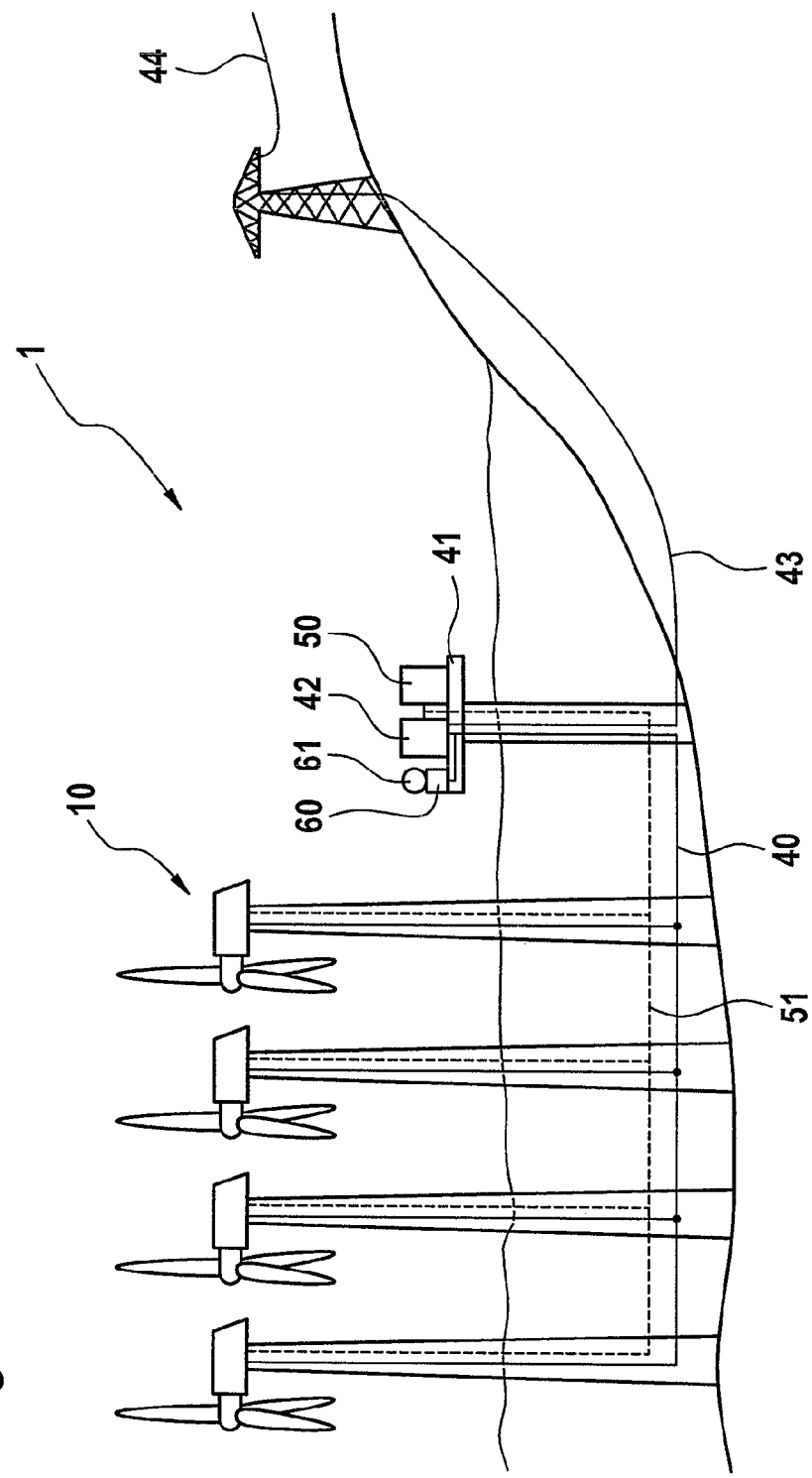
FIG. 1: a wind farm according to the invention.

FIG. 1 illustrates a wind farm 1 according to the invention, which is operated with the method according to the invention. The wind farm 1 in FIG. 1 is an offshore wind farm, i.e. a wind farm 1 that was erected in the open sea off a coastline.

Figure 2:
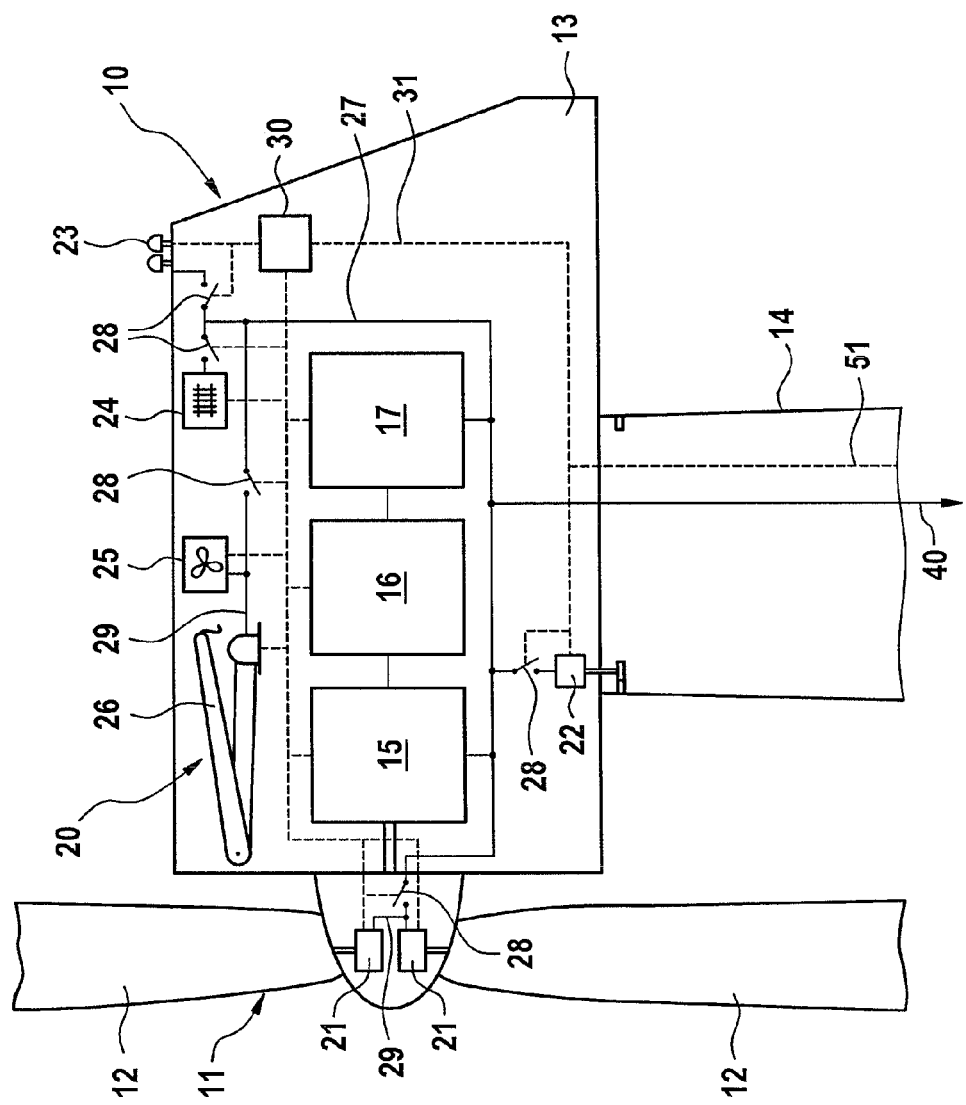
FIG. 2: a wind energy installation of the wind farm of FIG. 1.

The wind farm 1 comprises a plurality of wind energy installations 10, of which one wind energy installation 10 is illustrated in detail as an example in FIG. 2. A wind energy installation 10 comprises a rotor 11 with rotor blades 12 arranged rotatably in a nacelle 13 at the top of a tower 14. The rotor 11 drives a generator 15, which is preferably a double-fed asynchronous generator. An inverter 16 is connected to the generator 15. A transformer 17 is also provided that transforms the voltage output from the inverter 16. The wind energy installation 10 is connected to a grid 40 internal to the wind farm through the transformer 17 in such a way that the power generated by the wind energy installation 10 is fed into the grid 40 internal to the wind farm.

In addition, a pitch adjusting unit 21 with a drive unit for adjusting the pitch of the individual rotor blades 12, positioning motors 22 with which the nacelle 13 can be pivoted in azimuth with respect to the tower 14, aviation obstruction lighting 23, heating elements 24, fans 25 and an on-board crane 26 are also provided at the wind energy installation 10. All of the components just mentioned are electrical consumers 20. The electrical consumers are connected via connecting cables 27 to the grid 40 internal to the wind farm, from which they can obtain the energy necessary for their operation. Power contactors 28 are provided in some of the connecting cables 27 between the relevant electrical consumers 20 and the grid 40 internal to the wind farm, with which power contactors the supply of energy from the grid 40 internal to the wind farm to an electrical consumer 20 can be interrupted. Some of the electrical consumers 20 are connected together electrically via a busbar 29, wherein the busbar 29 is in turn connected via a connecting cable 27 comprising a power contactor 28, to the grid 40 internal to the wind farm.

The operation of the wind energy installation 10 is controlled by an operating control unit 30. It acts via control cables 31 on the individual components 15-17, 20 of the wind energy installation 10. The operating control unit 30 is moreover connected to the power contactors 28, and can operate them.

A transfer station 42 located on a central platform 41 is also connected to the grid 40 internal to the wind farm. The electrical power generated by the wind energy installations 10 is transferred from the grid 40 internal to the wind farm via a mains connecting cable 43 to an external supply grid 44 at this transfer station 42. The grid 40 internal to the wind farm is a medium-voltage grid, whereas the supply grid 44 is a high-voltage grid. In order to be able to feed the power from the grid 40 internal to the wind farm to the supply grid 43, the transfer station 42 comprises a transformer (not illustrated). It is also possible for the transfer station 42 and/or the aforementioned transformer not to be located offshore on the central platform 41, but to be arranged on land. In the latter case the grid internal to the wind farm extends along the mains connecting cable 43 onto land.

A farm master 50, that is connected over data cables 51 to the transfer station 42 and to the operating control units 30 of the individual wind energy installations 10 is also arranged on the central platform 41. A mains substitute supply unit 60 in the form of a fuel-powered emergency power generator, with an associated fuel tank 61, is also located on the central platform 41.

When there is no fault, the farm master 50 and the operating control units 30 control the wind energy installations 10 in a known manner. The operating control units 30 of the wind farm 1 according to the invention furthermore have a grid fault mode. This mode is activated when, as a result of a fault, it is not possible to feed power from the grid 40 internal to the wind farm into the supply grid 44. Possible reasons for such a fault are failure of the supply grid 44, failure of the transfer station 42 and/or of the transformer, or damage to the mains connecting cable 43. Corresponding faults are grouped together under the general concept of "grid fault". The operating control units 30 are themselves able to detect a grid fault. It is, however, also possible for the farm master 50 to be designed to detect grid faults, and to report grid faults via the data cables 51 to the operating control units 30.

If a grid fault is detected, the wind energy installations 10 are shut down, i.e. the operating control units 30 control the individual components in such a way that within a very short time the wind energy installations 10 no longer feed power into the grid 40 internal to the wind farm.

In order that the electrical consumers 20 that are connected to the grid 40 internal to the wind farm via the connecting cables 27 can continue to be supplied with energy, the mains substitute supply unit 60 is switched on when there is a grid fault, and is then the only source of energy on the grid 40 internal to the wind farm. Mains substitute supply unit 60 feeds the electrical power into the grid 40 internal to the wind farm that is necessary for operation of electrical consumers 20. The mains substitute supply unit 60 can be switched on by the farm master 50, by the operating control unit 30, or by separate equipment for detecting grid faults.

The electrical consumers 20 of a wind energy installation are divided into three groups for the grid fault mode. The electrical consumers of the first group are entirely essential for the survival and safety of the wind energy installation 10. In the exemplary embodiment illustrated, the positioning motors 22 for azimuth adjustment and the aviation obstruction lighting 23 belong to the first group. The positioning motors 22 for azimuth adjustment are necessary for survival of the wind energy installation 10, so that the rotor 11 can be turned out of the wind. In this way it is possible to ensure that the wind energy installation 10 is not damaged by wind. The aviation obstruction lighting 23 ensures the safety of the wind energy installation 10.

Those electrical consumers 10 that can also be needed during a grid fault, but without the safety or survival of the wind energy installation depending on them, are assigned to the second group. In the exemplary embodiment illustrated, the heating elements 24 and the pitch adjusting units 21 constitute the electrical consumers 20 of the second group.

Those electrical consumers 20 that are not needed during a grid fault are assigned to the third group. In the exemplary embodiment illustrated these include the fans 25 and the on-board crane 26.

Only the power generated by the mains substitute supply unit 60 is available for operation of the electrical consumers 20 during a grid fault. In grid fault mode, the electrical consumers 20 are switched on and off in accordance with the invention in such a way that at least enough electrical power is always available for operation of the electrical consumers 20 of the first group.

For this purpose the farm master 50 first calculates a maximum consumption value 90. The maximum consumption value 90 indicates how much electrical power is available for the individual wind energy installations 10 during a grid fault.

The maximum consumption value 90 can be calculated at the moment of the grid fault or at regular intervals during normal operation, and may be stored in the farm master 50. The maximum consumption value 90 is calculated from the maximum power 91 of the mains substitute supply unit 60. This value 91 can be stored in the farm master 50, or is transmitted to it by the mains substitute supply unit 60 over a data cable (not illustrated). A value for a base load 92 is also stored in the farm master 50. This base load value 92 represents amongst other things the losses that arise in the course of transport of the power generated by the mains substitute supply unit 60 over the grid 40 internal to the wind farm to the wind energy installations 10, e.g. losses arising from cable resistances. The energy requirement of the farm master 50 itself also contributes to the base load 92. The base load 92 indicates how much of the power generated by the mains substitute supply unit 60 is actually available at the wind energy installations 10 for operation of the electrical consumers 20. The base load 92 can be given as an absolute magnitude, wherein it is then subtracted from the maximum power 91 of the mains substitute supply unit 60 (cf. FIG. 3a). It is also, however, possible for the base load 92 to be given as a relative factor 92', wherein this, or a value derived from it, can then be multiplied with the maximum power 91 of the mains substitute supply unit 60 (cf. FIG. 3b).

The value calculated from the maximum power 91 of the mains substitute supply unit 60 and the base load 92 is then divided by the number 93 of wind energy installations 10. The number 93 can here reflect the total number of wind energy installations 10 in the wind farm 1. It is, however, also possible that only those wind energy installations 10 that are effectively connected to the grid 40 internal to the wind farm are taken into account. If a wind energy installation 10 is disconnected for technical reasons from the grid 40 internal to the wind farm, its electrical consumers 20 can also not draw energy from the grid 40 internal to the wind farm, and consequently do not have to be included in the calculation of the maximum consumption value 90.

It is also possible to calculate an individual maximum consumption value 90 for each wind energy installation. In this way it is possible to take account of the fact that the power requested in the event of a grid fault by individual wind energy installations 10 that are not identically constructed can be different. The total of the maximum consumption values 90 must, however, not exceed the maximum power 91 of the mains substitute supply unit 60.

The farm master 50 transmits the maximum consumption value or values 90 over the data cables 51 to the operating control units 30 of the individual wind energy installations 10.

When a grid fault occurs, the operating control unit 30 of a wind energy installation 10 first switches the electrical consumers 20 of the third group off by means of power contactor 28. A plurality of electrical consumers 20 can be connected by a busbar 29, so that a single power contactor 28 arranged between the busbar 29 and the connecting cable 27 is switched off in order to switch off all of the electrical consumers 20 that are connected to the busbar 29. In the exemplary embodiment illustrated, fans 25 and the on-board crane 26 are connected to a busbar 29. Because of the busbar 29, a single power contactor 28 is sufficient to switch off the electrical consumers 20 of the third group.

Because the electrical consumers 20 of the third group are always switched off in the event of a grid fault, they do not use any electrical energy.

The electrical consumers 20 of the first group are always switched on by the operating control unit 30 when requested, since these are electrical consumers 20 that are entirely essential for the safety and survival of the wind energy installation 10. The electrical consumers 20 of the first group are not, however, only those that must remain switched on all the time. Rather the first group can also include those that are switched on when requested—i.e. when they are actually needed. In the exemplary embodiment illustrated, the positioning motors 22 for azimuth adjustment, and the aviation obstruction lighting 23 belong to the first group. It is, however, only necessary for the aviation obstruction lighting 23 to be continuously supplied with energy at all times, i.e. to be switched on. For those electrical consumers 20 that must always remain switched on even during a grid fault, it may even be possible to omit a power contactor 28 for switching them off. The positioning motors 22 for azimuth adjustment only need to be switched on when it is actually necessary to change the azimuth angle of the nacelle 13 and therefore of the rotor 11. These electrical consumers 20 can be switched off for the rest of the time.

The maximum consumption value 90 for a wind energy installation 10, or the maximum available power calculated from it, is sufficient to be able to operate all the electrical consumers 20 of the first group in the event of a grid fault.

The electrical consumers 20 that belong neither to the first nor to the third group are put into the second group. This group comprises all the electrical consumers which, while not entirely essential for the survival and safety of the wind energy installation 10, are nevertheless necessary in order, for example, to avoid damage or other deterioration to individual components of the wind energy installation 10. In the exemplary embodiment illustrated, the second group includes a heating element 24 with which the formation of ice on the nacelle 13 can be prevented, as well as the pitch adjusting units 21. Because the pitch adjusting units 21 for the individual rotor blades are usually always operated simultaneously, they are connected by a bulbar 29. For this reason a power contactor 28 for switching on or off all the pitch adjusting units 21 is sufficient.

The electrical consumers 20 of the second group are then only switched on when sufficient power reserves are available, i.e. when sufficient power from the mains substitute supply unit 60 is available to operate an electrical consumer 20. For this purpose, the operating control unit calculates the power reserve 95, which is given by the difference between the maximum consumption value 90 and the actual consumption 96 of the electrical consumers 20 of a wind energy installation 10 that are switched on (cf. FIG. 4). The actual consumption 96 can here be determined by an appropriately designed measuring instrument (e.g. a power meter). It is alternatively possible for values for the power consumption of the individual electrical consumers 20 to be stored in the operating control unit 30. The operating control unit can then calculate the actual consumption 96 from the total of the values for the power consumptions of all the electrical consumers 20 that are switched on.

The operating control unit 30 working in grid fault mode only switches an electrical consumer 20 of the second group on if the power reserve 95 is greater than the value stored in the operating unit 30 for the power consumption of this particular electrical consumer 20. This ensures that no more power is consumed by electrical consumers 20 in a wind energy installation 10 than is available for the wind energy installation during a grid fault.

An electrical consumer 20 of the first group is always switched on when requested (e.g. the positioning motors 22 for azimuth adjustment). If it is determined that enough power is no longer available for operating the requested electrical consumer 20, one or more electrical consumers 20 of the second group are switched off so that sufficient power is available for operation of the electrical consumer 20 of the first group. The shortage of power for the operation of an electrical consumer 20 of the first group can be determined in that after being switched on, the measured or calculated actual consumption 96 is greater than the maximum consumption value 90, whereupon one or more electrical consumers 20 of the second group are then switched off. It is alternatively possible for the calculated power reserve 95 to be compared with the value stored in the operating control unit 30 for the power consumption of the electrical consumer 20 of the first group, and to switch electrical consumers 20 of the second group off until the power reserve 95 is greater than the value for the power consumption of the electrical consumer 20 of the first group.

The division of the electrical consumers 30 into various groups implements prioritization. Electrical consumers 20 that are entirely essential for the safety and the survival of the wind energy installation 10 are always switched on when requested. Electrical consumers 20 that are not entirely essential are only switched on if a sufficient power reserve 95 is available. In particular, the electrical consumers 20 of the second group are switched off when insufficient power is available for operation of all the requested electrical consumers 20 of the first group. The electrical consumers 20 of the third group are not needed, and are therefore always switched off during a grid fault in order to save energy.

It is furthermore provided that the operating control units 7 transmit the requests of electrical consumers 20 (possibly in association with the value for the power requirement of the requested electrical consumers 20) and the power reserve 95 over the data cables 51 to the farm master 50. On the basis of these values from at least some of the wind energy installations 10 the farm master 50 can for a short time lower the maximum consumption values 90 of individual wind energy installations 10, and simultaneously increase the maximum consumption values 90 of other wind energy installations. In this way it is possible for the power reserve 95 to be reduced for a wind energy installation 10 whose power reserve 95 is not fully utilized. The power reserve 95 withdrawn from such a wind energy installation 10 can be added to another wind energy installation 10 whose own power reserve 95 would not be sufficient to operate all the requested electrical consumers 20—including those of the second group. If an electrical consumer 20 of the first group is requested at a wind energy installation 10 whose power reserve 95 has been reduced as described, the transfer of power reserve 95 described is reversed. In this way it is ensured that there is always enough power available to every wind energy installation 10 to operate at least all the requested consumers 20 of the first group.

In grid fault mode the operating control unit 30 is still able to change operating parameters of the wind energy installation 10. It is, for example, possible for the minimum temperature in the nacelle 13 to be reduced in comparison with normal operating mode. The consequence of this is that less energy is consumed by the heating element 26. Since the wind energy installation 10 is not operated in grid fault mode, i.e. the generator 15 is not driven by the rotor 11, a lower minimum temperature can be selected without any expectation of damage.

It is further possible for one of the wind energy installations 10 to continue to be operated during a grid fault, so that the wind energy installation 10 can feed power into the grid 40 internal to the wind farm. The power required from the mains substitute supply unit 60 is then reduced by the power generated by this wind energy installation 10. As a result the fuel consumption of the mains substitute supply unit 60 is also reduced.

The invention claimed is:

1. A method for operating a wind farm having a plurality of wind energy installations connected to a grid internal to the wind farm, each having an operating control unit and other electrical components comprising electrical consumers, and a mains substitute supply unit connected to at least some of the electrical consumers of the wind energy installations, wherein the electrical consumers of each wind energy installation are divided into at least two groups comprising a first group and a second group, at least consumption values of the electrical consumers of the second group are stored in the operating control unit of the wind energy installation concerned, the electrical consumers can be switched on and off by the operating control unit of the wind energy installation concerned when requested, and the operating control unit has a grid fault mode in which a power reserve is calculated from a maximum consumption value of the wind energy installation concerned and actual consumption of the electrical consumers that are switched on, comprising:
    switching, by the operations control unit, one of the electrical consumers of the first group on when requested,
    switching, by the operations control unit, one of the electrical consumers of the second group on when requested and when the power reserve is greater than or equal to the consumption value of the requested electrical consumer, and
    changing operating parameters of one of the wind energy installations when in grid fault mode.

2. The method of claim 1, wherein when the consumption value stored in the operating control unit for a requested electrical consumer of the first group is greater than the power reserve, one or more electrical consumers of the second group are switched off.

3. The method of claim 1, wherein when an actual consumption is greater than the maximum consumption value, one or more electrical consumers of the second group are switched off.

4. The method of claim 1, wherein a farm master is connected to the operating control units and transmits the maximum consumption value to the operating control units.

5. The method of claim 4, wherein the maximum consumption value is calculated from a specified value of the maximum power of the mains substitute supply unit, a base load, and the number of wind energy installations in the wind farm.

6. The method of claim 4, wherein the operating control units transmit the actual consumption and requests for switching on electrical consumers to the farm master, and the farm master, on the basis of this information, reduces the maximum consumption value of one or more wind energy installations for a short period, while simultaneously the maximum consumption value of one or more wind energy installations is increased.

7. The method of claim 1, wherein the actual consumption is measured or calculated on the basis of consumption values for the electrical consumers of the first and second groups stored in the operating control unit.

8. The method of claim 1, wherein the operating control unit in grid fault mode switches off electrical consumers of a third group of the at least two groups.

9. The method of claim 1, wherein at least one wind energy installation continues to be operated in grid fault mode, so that it feeds electrical power into the grid internal to the wind farm.

10. A wind farm comprising:
a plurality of wind energy installations connected to a grid internal to the wind farm, each having an operating control unit and other electrical components comprising electrical consumers, and
a mains substitute supply unit connected to at least some of the electrical consumers of the wind energy installations,
wherein the electrical consumers of each wind energy installation are divided into at least two groups comprising a first group and a second group, at least consumption values of the electrical consumers of the second group are stored in the operating control unit of the wind energy installation concerned, the electrical consumers can be switched on and off by the operating control unit of the wind energy installation concerned when requested, the operating control unit has a grid fault mode in which a power reserve is calculated from a maximum consumption value of the wind energy installation concerned and actual consumption of the electrical consumers that are switched on, the operating control unit switches one of the electrical consumers of the first group on when requested and switches one of the electrical consumers of the second group on when requested and when the power reserve is greater than or equal to the consumption value of the requested electrical consumer, and operating parameters of one of the wind energy installations are changed when in grid fault mode.

11. The wind farm of claim 10, wherein a plurality of electrical consumers are connected via a busbar.

12. The wind farm of claim 10, wherein when the consumption value stored in the operating control unit for a requested electrical consumer of the first group is greater than the power reserve, one or more electrical consumers of the second group are switched off.

13. The wind farm of claim 10, wherein the mains substitute supply unit is connected to at least some of the electrical consumers via the grid internal to the wind farm.

14. The wind farm of claim 10, comprising one or more power contactors configured to switch electrical consumers on and off.

* * * * *